(12) United States Patent
Leuz et al.

(10) Patent No.: US 6,968,682 B1
(45) Date of Patent: Nov. 29, 2005

(54) METHOD AND DEVICE FOR CONTROLLING AN INTERNAL COMBUSTION ENGINE WITH AN EXHAUST TREATMENT SYSTEM

(75) Inventors: Markus Leuz, Schoental-Oberkessach (DE); Andreas Pfaeffle, Wuestenrot (DE); Ralf Schernewski, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/030,888

(22) PCT Filed: Apr. 27, 2000

(86) PCT No.: PCT/DE00/01322

§ 371 (c)(1),
(2), (4) Date: Jun. 7, 2002

(87) PCT Pub. No.: WO00/68557

PCT Pub. Date: Nov. 16, 2000

(30) Foreign Application Priority Data

May 7, 1999 (DE) ................................. 199 21 299
Mar. 22, 2000 (DE) ................................. 100 14 224

(51) Int. Cl.$^7$ ............................................. F01N 3/02
(52) U.S. Cl. ............................. 60/311; 60/274; 60/297
(58) Field of Search .......................... 60/274, 285, 311, 60/297

(56) References Cited

U.S. PATENT DOCUMENTS

| | | | | |
|---|---|---|---|---|
| 4,404,795 A | * | 9/1983 | Oishi et al. ................ | 60/274 |
| 4,462,208 A | * | 7/1984 | Hicks et al. ................ | 60/311 |
| 4,574,589 A | * | 3/1986 | Hasegawa et al. ........... | 60/286 |
| 4,615,172 A | * | 10/1986 | Mayer ........................ | 60/274 |
| 5,097,665 A | * | 3/1992 | Kammel ..................... | 60/275 |
| 5,121,601 A | * | 6/1992 | Kammel ..................... | 60/275 |
| 5,195,316 A | * | 3/1993 | Shinzawa et al. ........... | 60/274 |
| 5,195,318 A | * | 3/1993 | Shinzawa et al. ........... | 60/285 |
| 5,287,698 A | * | 2/1994 | Shinzawa et al. ........... | 60/286 |
| 5,319,930 A | * | 6/1994 | Shinzawa et al. ........... | 60/286 |
| 5,458,673 A | * | 10/1995 | Kojima et al. ............... | 95/11 |
| 5,647,669 A | | 7/1997 | Junginger et al. ........... | 374/144 |
| 5,746,989 A | * | 5/1998 | Murachi et al. ............. | 423/213.7 |
| 5,850,735 A | * | 12/1998 | Araki et al. ................. | 60/274 |

FOREIGN PATENT DOCUMENTS

| | | | | |
|---|---|---|---|---|
| DE | 37 23 470 | | 1/1989 | |
| DE | 38 32 790 | | 3/1990 | |
| DE | 42 30 180 | | 3/1994 | |
| DE | 197 14 293 | | 9/1998 | |
| DE | 198 38 032 | | 3/1999 | |
| DE | 197 44 067 | | 4/1999 | |
| DE | 199 06 287 | | 8/2000 | |
| EP | 0 260 031 | | 3/1988 | |
| JP | 56-510 | * | 1/1981 | ................ 60/311 |

(Continued)

OTHER PUBLICATIONS

Patent Abstracts of Japan, vol. 1995, No. 05, Jun. 30, 1995.

(Continued)

*Primary Examiner*—Thomas Denion
*Assistant Examiner*—Diem Tran
(74) *Attorney, Agent, or Firm*—Kenyon & Kenyon

(57) ABSTRACT

In a method and device for controlling an internal combustion engine having an exhaust treatment system, a quantity characterizing the status of the exhaust treatment system is determined on the basis of at least one operating parameter of the internal combustion engine.

6 Claims, 3 Drawing Sheets

FOREIGN PATENT DOCUMENTS

| | | | |
|---|---|---|---|
| JP | 405044439 | * | 2/1993 |
| JP | 07 034924 | | 2/1995 |
| JP | 08 035418 | | 2/1996 |
| JP | 11 117786 | | 4/1999 |

OTHER PUBLICATIONS

Patent Abstracts of Japan, vol. 1996, No. 06, Jun. 28, 1996.
Patent Abstracts of Japan, vol. 1999, No. 09, Jul. 30, 1999.

* cited by examiner

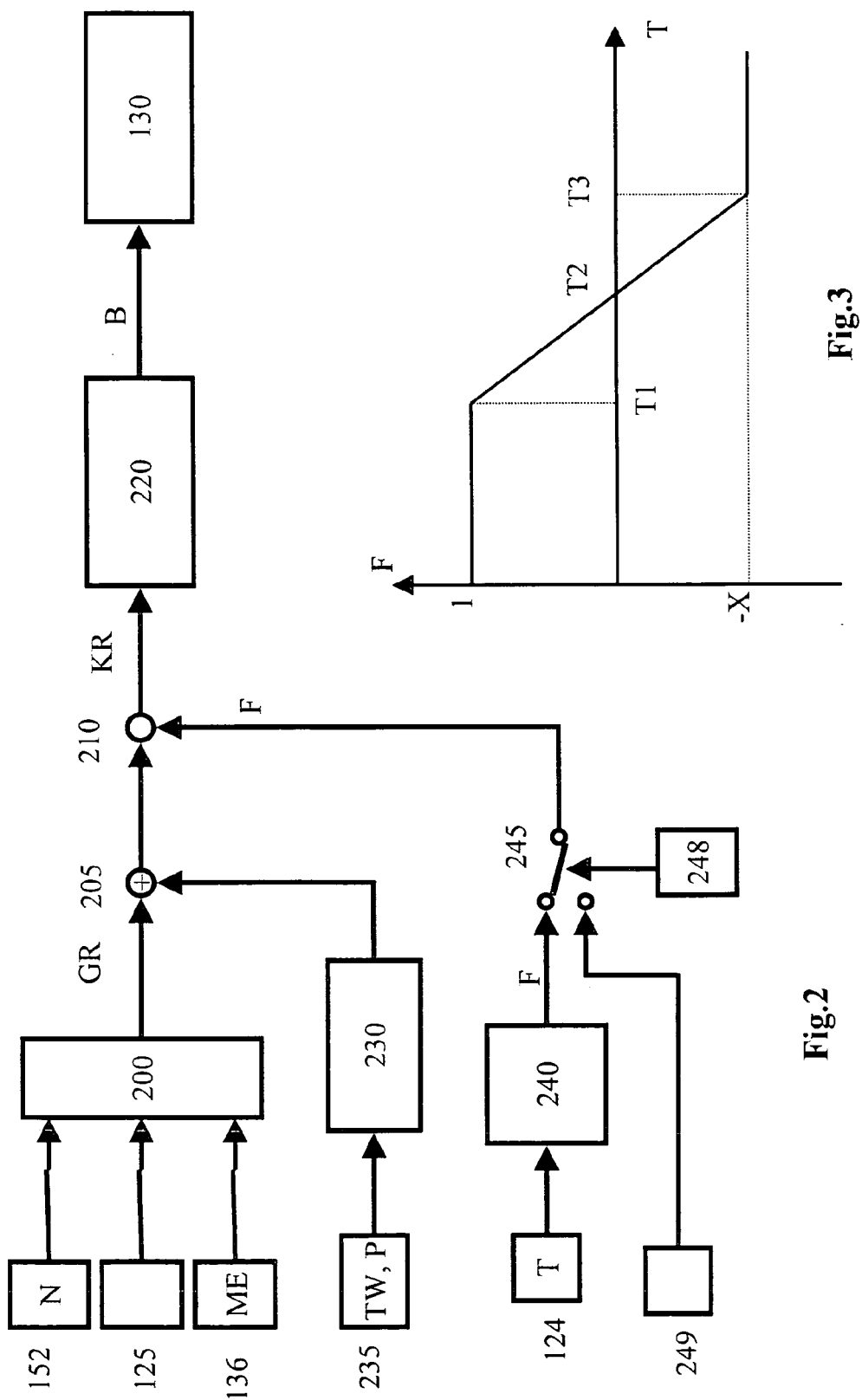

METHOD AND DEVICE FOR CONTROLLING AN INTERNAL COMBUSTION ENGINE WITH AN EXHAUST TREATMENT SYSTEM

FIELD OF THE INVENTION

The present invention relates to a method and a device for controlling an internal combustion engine having an exhaust treatment system.

BACKGROUND INFORMATION

A method and a device for controlling an internal combustion engine having an exhaust treatment system is described in German Published Patent Application No. 199 06 287. The system described in this document uses a particle filter that filters out particles contained in the exhaust gas. To precisely control an internal combustion engine having an exhaust treatment system, the status of the exhaust treatment system must be known. In particular, the filter's state of congestion, i.e., the volume of filtered-out particles, must be known.

It is an object of the present invention to provide a method and a device that can be used to detect the status of the exhaust treatment system. In particular, the state of congestion must be detected even when different sensors fail or when no special sensors are used.

SUMMARY

The method according to the present invention provides for the detection of the status of the exhaust treatment system. Simulating a quantity that characterizes the status of the exhaust treatment system, based on at least one operating parameter of the internal combustion engine, eliminates the need for additional sensors. If additional sensors are used, they may be monitored and an emergency mode may be implemented. Quantities may be used for the simulation that are already being used to control the internal combustion engine.

A quantity that characterizes the oxygen concentration in the exhaust gas may also be used. This can significantly improve the simulation of the status of the exhaust treatment system. This applies, for example, to dynamic states, i.e., more accurate values can be achieved, particularly during acceleration.

BRIEF DESCRIPTION OF THE DRAWINGS

FIG. 2 is a block diagram for detecting the state of congestion according to the present invention.

FIG. 3 illustrates a characteristic curve.

DETAILED DESCRIPTION

Figure 1:
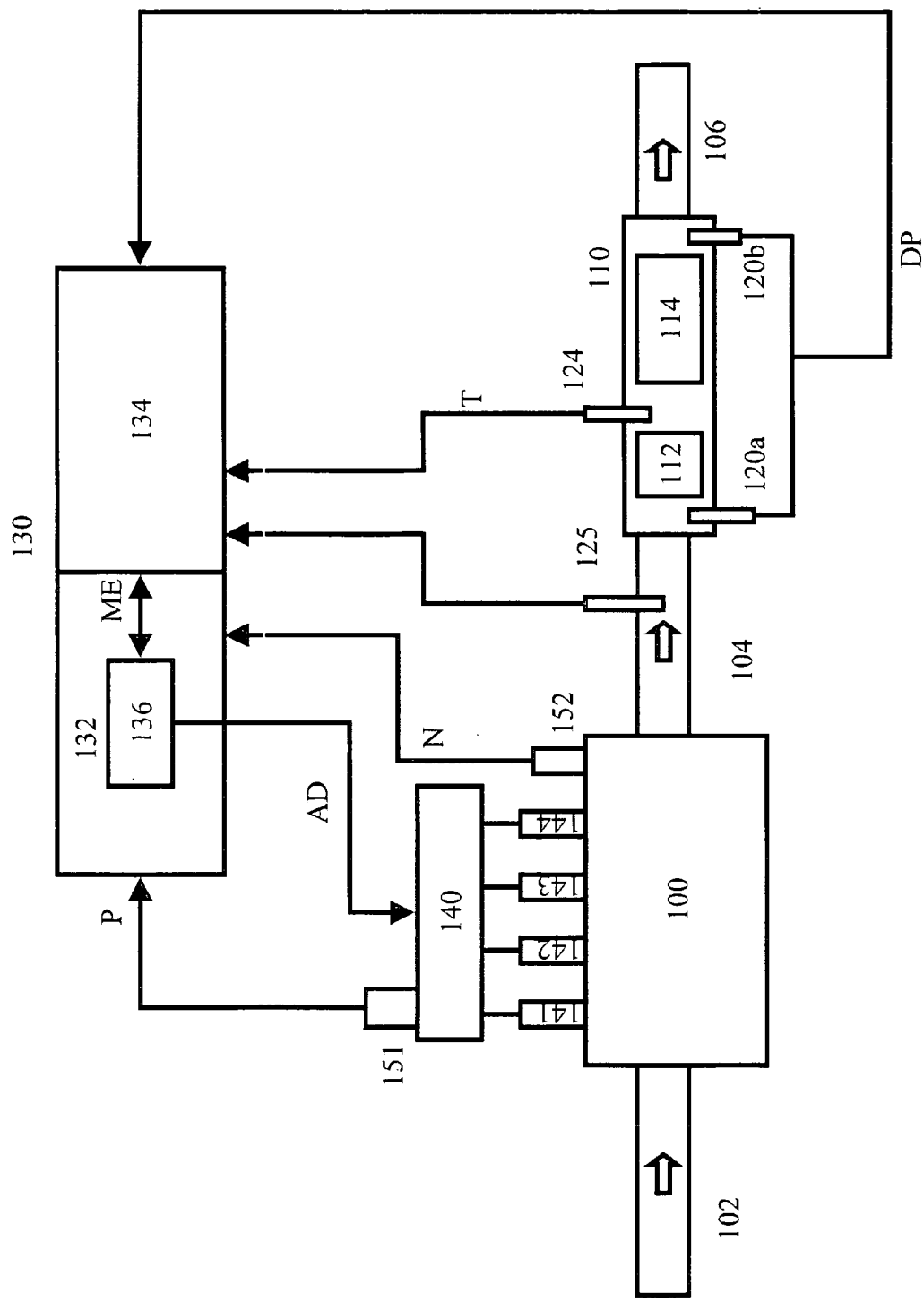
FIG. 1 is a block diagram of the device according to the present invention.

The device according to the present invention is described below, based on an example of an internal combustion engine having spontaneous ignition in which fuel metering is controlled by a common-rail system. However, the present invention is not limited to these systems. It may also be used with other internal combustion engines.

An internal combustion engine 100 receives a supply of fresh air via an intake line 102 and discharges exhaust gases via an exhaust line 104. An exhaust treatment unit 110, from which the cleaned exhaust gases pass through line 106 to the environment, is provided in exhaust line 104. Exhaust treatment unit 110 includes a primary catalytic converter 112 and a downstream filter 114. A temperature sensor 124, which provides a temperature signal T, may be located between primary catalytic converter 112 and filter 114. Sensors 120a and 120b are provided upstream from primary catalytic converter 112 and downstream from filter 114, respectively. These sensors act as differential-pressure sensors 120 and provide a differential-pressure signal DP, which characterizes the differential pressure between the inlet and outlet of the exhaust treatment unit.

A sensor 125 may be provided to supply a signal characterizing the oxygen concentration in the exhaust gas. This quantity may be calculated on the basis of other measured values or be determined by a simulation.

Fuel is supplied to internal combustion engine 100 via a fuel metering unit 140. This unit meters fuel to the individual cylinders of internal combustion engine 100 via injectors 141, 142, 143 and 144. The fuel metering unit may be a common rail system. A high-pressure pump delivers fuel to an accumulator. The fuel passes from the accumulator to the internal combustion engine via the injectors.

Various sensors 151, which provide signals that characterize the status of the fuel metering unit, are attached to fuel metering unit 140. In the case of a common rail system, these signals may include, for example, a pressure P in the accumulator. Sensors 152 that characterize the status of the internal combustion engine are attached to internal combustion engine 100. These sensors may include a speed sensor that provides a speed signal N and additional sensors that are not illustrated.

The output signals from these sensors are supplied to a control system 130, which is represented by a first control subsystem 132 and a second control subsystem 134. The two control subsystems may form a single structural unit. First control subsystem 132 may control fuel metering unit 140 via control signals AD, which influence fuel metering. For this purpose, first control subsystem 132 includes a fuel volume controller 136. The fuel volume controller 136 supplies a signal ME, which characterizes the volume to be injected, to second control subsystem 134.

Second control subsystem 134 may control the exhaust treatment system, for which purpose it detects the corresponding sensor signals. Second control subsystem 134 also exchanges signals with first control subsystem 132, including those relating to injected fuel volume ME. Both control systems may make mutual use of the sensor signals and internal signals.

The first control subsystem, which is also referred to as engine controller 132, controls control signal AD for controlling fuel metering unit 140 as a function of various signals that characterize the operating state of fuel injection system 100, the status of fuel metering system 140 and the ambient conditions, as well as a signal that characterizes the desired power output and/or torque. Devices of this type are conventional and are used in many different applications.

In the case of diesel-powered internal combustion engines, particle emissions may occur in the exhaust gas. In this case, exhaust treatment unit 110 must filter these particles out of the exhaust gas. This filtering action causes particles to collect in filter 114. To clean the filter, these particles are then burned in certain operating states and/or at the end of certain time periods. For this purpose, the temperature in exhaust treatment unit 110 is usually increased to the point at which the particles combust, thus regenerating filter 114.

Primary catalytic converter 112 is provided to increase the temperature. For example, the temperature is increased by increasing the proportion of uncombusted hydrocarbons in the exhaust gas. These uncombusted hydrocarbons then react in primary catalytic converter 112, thereby increasing its temperature and thus also the temperature of the exhaust gas that enters filter 114.

Increasing the temperature of the primary catalytic converter and exhaust gas in this manner increases fuel consumption and should therefore be carried out only when necessary, i.e., when a certain volume of particles has accumulated in filter 114. One way to detect the state of congestion is to measure differential pressure DP between the inlet and outlet of the exhaust treatment unit 110 and to determine the state of congestion based on this value. Differential-pressure sensor 120 is provided for this purpose.

According to the present invention, the anticipated particle emissions are determined on the basis of different quantities, such as speed N and injected fuel volume ME, thereby simulating the state of congestion. Once a specific state of congestion has been reached, filter 114 is regenerated by controlling fuel metering unit 140. Instead of speed N and injected fuel volume ME, other signals that characterize these quantities may also be used. For example, a control signal, such as a control duration for the injectors and/or a torque quantity, may be used as fuel volume ME.

In one example embodiment according to the present invention, in addition to injected fuel volume ME and speed N, temperature T in the exhaust treatment system may be used to calculate the state of congestion. Sensor 124 may be used for this purpose. The quantity for the state of congestion calculated in this manner is then used to control the exhaust treatment system, i.e., regeneration is initiated by increasing the temperature, as a function of the state of congestion.

The state of congestion may be measured via differential-pressure sensor 120 in addition to calculating the state of congestion. In this case, the system may be monitored for errors. Simulated quantity B and measured quantity BI of the state of congestion may be used to detect errors in the exhaust treatment system. When an error in differential-pressure sensor 120 is detected, an emergency mode may be implemented to control the exhaust treatment system, using the simulated quantity that characterizes the state of congestion.

FIG. 2 is a block diagram illustrating a method and a device for detecting the state of congestion, i.e., quantity B, which characterizes the status of the exhaust treatment system, according to the present invention. Elements already described in FIG. 1 are identified by the same reference numbers.

Output signals N of a speed sensor 152, a quantity ME of fuel metering controller 136, which characterizes the injected fuel volume, and/or a quantity characterizing the oxygen concentration, are supplied to a basic characteristic map 200. The quantity characterizing the oxygen concentration may be measured by a sensor or determined by a calculation 125.

Basic characteristic map 200 applies a quantity GR, which characterizes the initial value of the particle emission, to a first node 205. First node 205 applies a signal to a second node 210, which, in turn, applies a quantity KR which characterizes particle increment in filter 114, to an integrator 220. Integrator 220 supplies a quantity B, which characterizes the status of the exhaust treatment system. This quantity B corresponds to the state of congestion of filter 114. Quantity B is provided to control system 130.

The output signal of a first adjustment element 230, to which is supplied the output signal of different sensors 235, is present at the second input of node 205. Sensors 235 supply signals that characterize the ambient conditions. These include cooling water temperature TW, air temperature and air pressure PL. The output signal of a second adjustment element 240 is supplied to the second input of node 210 via a switching unit 245. Output signal T of sensor 124 is supplied to second adjustment element 240. Alternatively, the output signal of a default-value generator 249 may also be supplied to the second input of second node 210 via switching unit 245. Switching unit 245 is controlled by an error detector 248.

The oxygen concentration in the exhaust gas may be influenced with a further adjustment, corresponding to adjustment element 230.

Initial value GR of particle emission is stored in basic characteristic map 200 as a function of the operating state of the internal combustion engine, such as speed N, injected volume ME and/or the quantity characterizing the oxygen concentration. For example, speed N and the quantity characterizing the oxygen concentration may be used, or speed N and injected volume ME may be used.

Other quantities may also be used in addition to these quantities. Instead of volume ME, a quantity that characterizes the volume of injected fuel may be used.

This value is adjusted in first node 205 as a function of a temperature of the cooling water and ambient air as well as atmospheric pressure. This adjustment takes into account their influence on the particle emission of internal combustion engine 100.

The influence of the catalytic converter temperature is taken into account in second node 210. The adjustment takes into account the fact that, above a certain temperature T1, the particles are not deposited in the filter but are directly converted to harmless components. Below this temperature T1, the particles are not converted, but are all deposited in the filter.

As a function of temperature T of exhaust treatment unit 110, second adjustment element 240 sets a factor F by which basic emission GR may be multiplied.

FIG. 3 illustrates the correlation between factor F and temperature T. Up to temperature T1, factor F assumes a value of 1. Thus, below temperature T1, initial value GR is linked to factor F in node 210 so that value KR is equal to value GR. Above temperature T1, factor F decreases and reaches a value of zero at a certain temperature T2, i.e., the entire particle emission is converted directly to harmless components, thereby supplying no additional particles to filter 114. If the temperature exceeds value T3, the factor assumes a negative value of x, indicating a decrease in congestion of filter 114, even though particles are being supplied to filter 114.

If error detector 248 detects a defective temperature sensor T24, a default value from default-value generator 249 is used instead of temperature value T. This default value may be set as a function of different operating parameters, such as injected fuel volume ME.

Value KR, which has been adjusted in this manner and characterizes the particle value resulting in congestion of filter 114, is supplied to integrator 220. This integrator 220 sums up the quantity over time and emits a signal B that characterizes the state of congestion of filter 114. The adjusted output signal of the basic characteristic map is integrated to determine state of congestion B of filter 114.

Signal B, which characterizes the state of congestion of filter 114, may be used directly to control the exhaust treatment system. The use of a simulated quantity eliminates the need for various sensors, including differential-pressure sensor 120.

According to the present invention, the state of congestion is output from a characteristic map, based on at least the speed and/or the injected fuel volume or corresponding signals. The initial value determined in this manner is then adjusted. For example, it may be adjusted as a function of the temperature of the exhaust treatment unit, such as that of the particle filter. This adjustment takes into account continuous, temperature-dependent filter regeneration.

Figure 4:
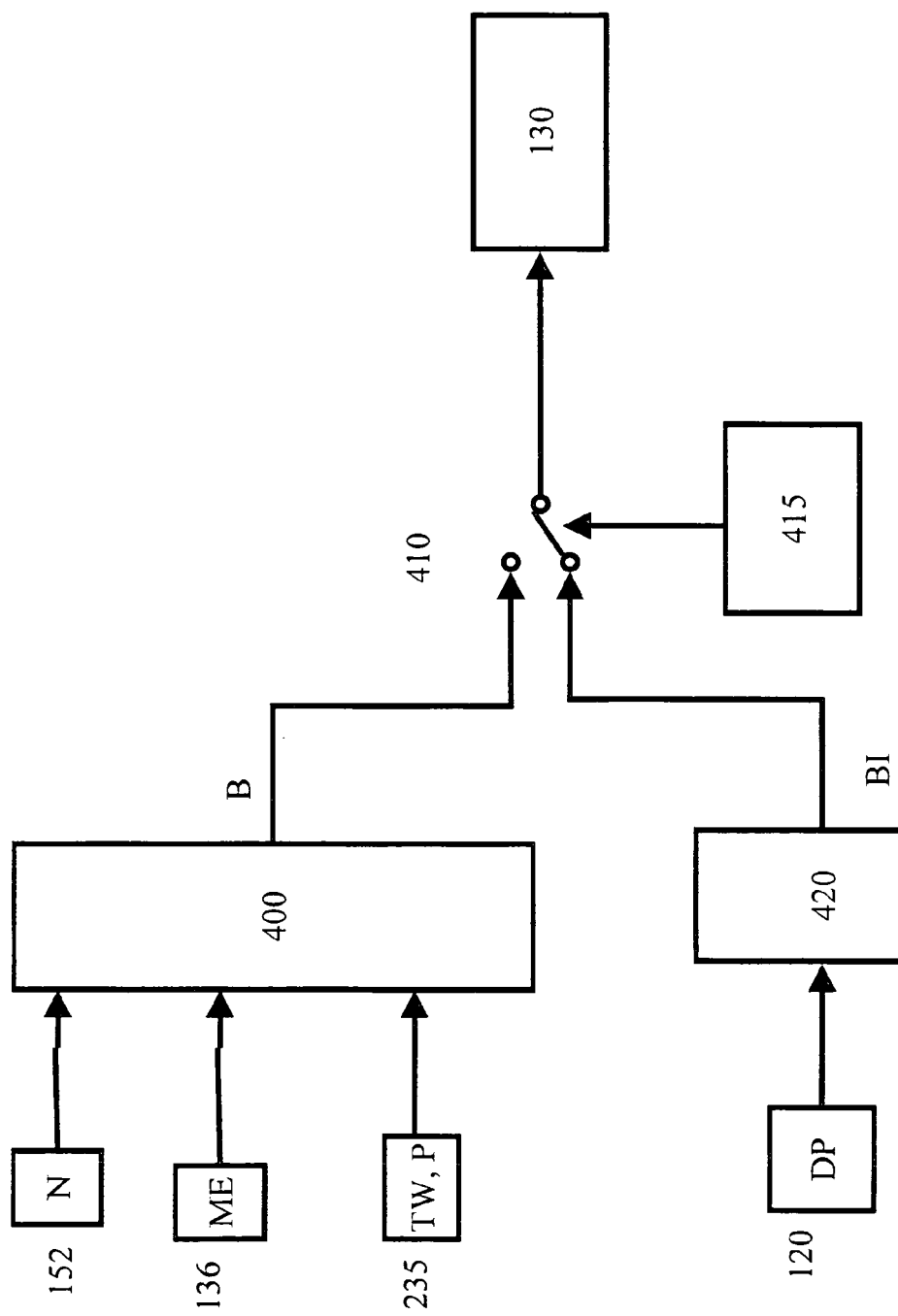
FIG. 4 is a block diagram of an example embodiment of the device according to the present invention.

FIG. 4 illustrates another example embodiment. Reference number 400 designates the simulation element illustrated in FIG. 2 to calculate state of congestion B. This simulation element 400 supplies a signal B for the state of congestion of filter 114. A further calculation element 420 is provided, to which output signal DP of differential-pressure sensor 120 is supplied. Both simulation element 400 and calculation element 420 supply signals to a switching unit 410, which selects one or another of the signals and provides it to control system 130. Switching unit 410 is controlled by an error detector 415.

Based on differential pressure DP, which is measured by differential-pressure sensor 120, air flow rate V may be calculated according to the following formula:

$$V = \frac{MH * R * T}{P + DP}$$

where quantity MH corresponds to the air rate measured by a sensor, while quantity R is a constant. Based on the air flow rate calculated in this manner, a characteristic map may be used to calculate state of congestion BI.

The exhaust treatment system is controlled during normal operation based on this state of congestion BI. If an error occurs in the exhaust treatment system, for example, when detecting or recording differential pressure DP, error detector 415 controls switching unit 410 so that signal B of simulation element 400 is used to control the exhaust treatment system.

In emergency mode, quantity (B) is used to control the exhaust treatment system. The system is controlled as a function of quantity (B), which characterizes the state of congestion, and/or additional signals. The simulated quantity may be used to implement a very accurate emergency mode. When used only in emergency mode, a simple simulation using only a few signals may be used.

The plausibility of calculated quantity (BI) and simulated quantity (B) of the state of congestion may be checked and an error in the exhaust treatment system in the event of implausibility may be detected. Implausibility is detected, for example, when the difference between the two quantities is greater than a threshold value. This means that quantity (B) of the state of congestion is used to detect the error. This procedure is a simple and accurate error detection method.

We claim:

1. A method for controlling an internal combustion engine having an exhaust treatment system that includes a particle filter, comprising:
    calculating a loading state of the filter, the process of calculating including:
    determining a particulate emission rate of the internal combustion engine based on at least: a) one first operating parameter of the internal combustion engine; and b) an oxygen concentration in exhaust gas of the internal combustion engine;
    integrating the particulate emission rate over time, resulting in a loading state of the particle filter; and
    detecting an error in a state of congestion derived based on exhaust gas flow rate in accordance with the loading state resulting from the integration.

2. The method according to claim 1, wherein the at least one operating parameter includes at least one of a rotational speed and a signal characterizing an injected fuel volume.

3. The method according to claim 1, wherein the step of determining the particulate emission rate includes considering an additional variable representing a temperature in the exhaust treatment system.

4. The method according to claim 1, further comprising the step of controlling the exhaust treatment system during a normal operation in accordance with the quantity.

5. The method according to claim 1, further comprising the step of controlling the exhaust treatment system during an emergency operation in accordance with the quantity.

6. A device for controlling an internal combustion engine having an exhaust treatment system including a particle filter, comprising:
    a processing unit configured to:
        calculate a loading state of the filter by:
        determining a particular emission rate of the internal combustion engine based on at least: a) one first operating parameter of the internal combustion engine; and b) an oxygen concentration in exhaust gas of the internal combustion engine;
        integrating the particle emission rate over time, resulting in a loading state of the particle filter; and
        detecting an error in a state of congestion derived based on exhaust gas flow rate in accordance with the loading state resulting from the integration.

* * * * *